Feb. 24, 1925.
J. TORSKE
1,527,495
VEGETABLE SACKER
Filed May 12, 1922    2 Sheets-Sheet 1
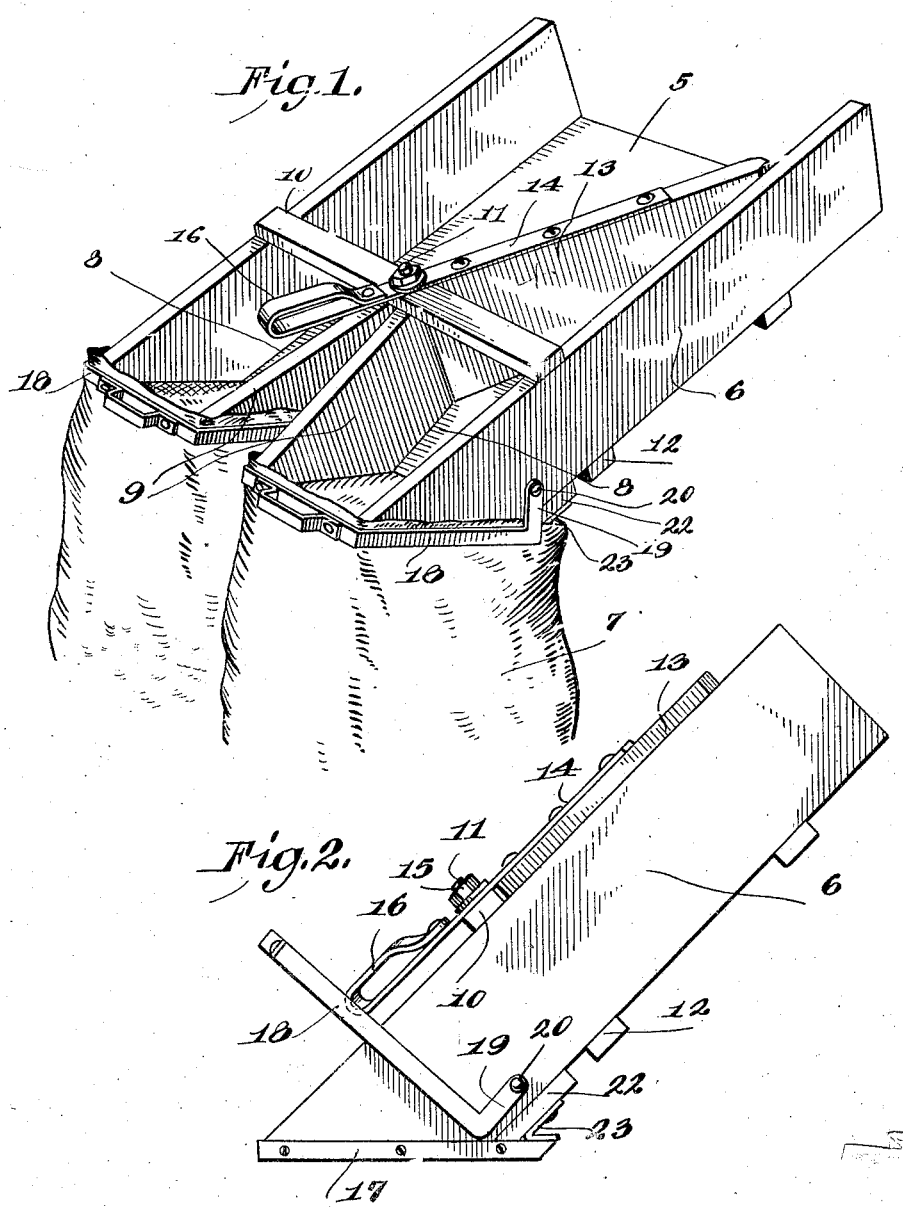
Inventor
John Torske
By C. A. Snow & Co.
Attorney

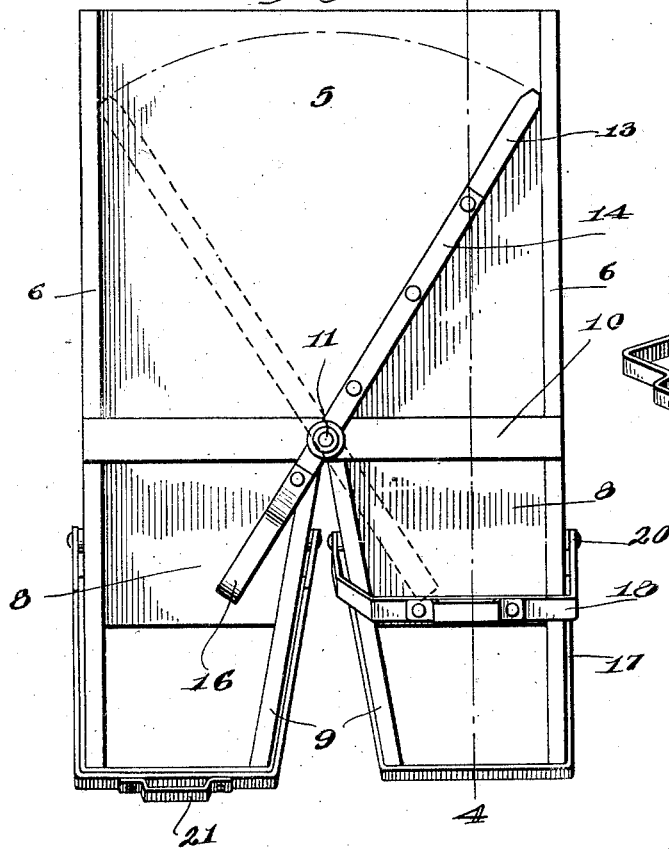
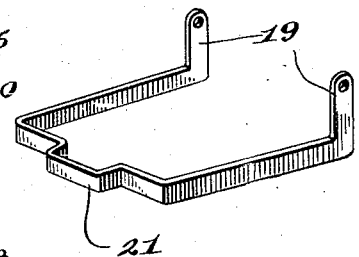
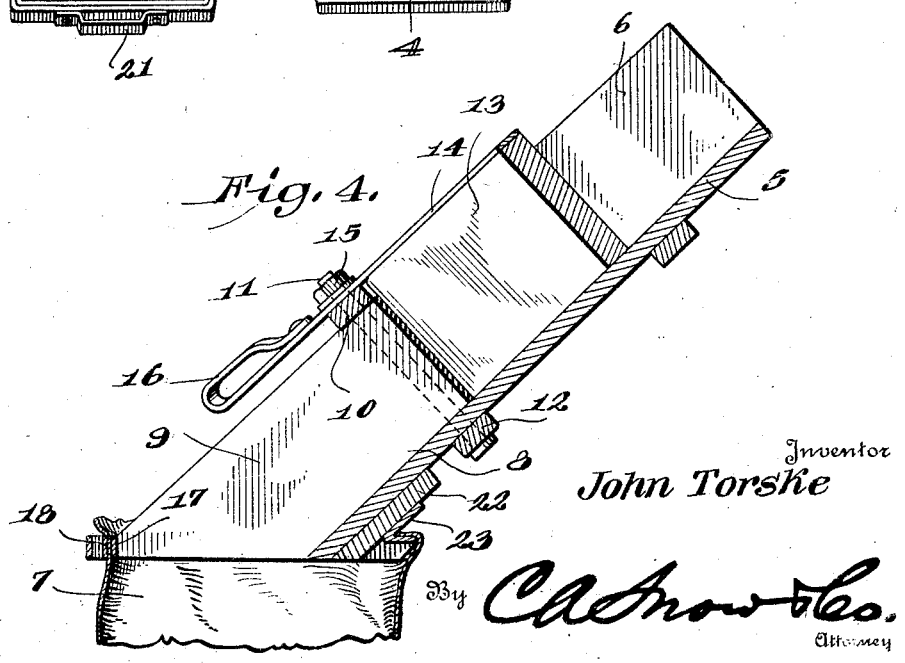

Patented Feb. 24, 1925.

1,527,495

UNITED STATES PATENT OFFICE.

JOHN TORSKE, OF ADA, MINNESOTA.

VEGETABLE SACKER.

Application filed May 12, 1922. Serial No. 560,293.

*To all whom it may concern:*

Be it known that I, JOHN TORSKE, a citizen of the United States, residing at Ada, in the county of Norman and State of Minnesota, have invented a new and useful Vegetable Sacker, of which the following is a specification.

This invention has reference to vegetable sackers and aims to provide novel means to be attached to a vegetable grader for delivering the vegetables to the sacks in which the vegetables are to be shipped.

An object of the invention is to provide means for preventing vegetables from passing into a filled sack.

Another object of the invention is to provide manually controlled means for directing the vegetables to the delivering spouts of the device.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a perspective view disclosing the chute and means for securing sacks to the spouts thereof.

Figure 2 is a side elevational view of the chute.

Figure 3 is a front elevational view thereof.

Figure 4 is a sectional view taken on line 2—2 of Figure 3.

Figure 5 is a perspective view of the sack securing clamp.

Referring to the drawings in detail, the delivery chute is indicated at 5, and embodies side members 6 which extend upwardly therefrom, and have their lower forward edges cut at angles with respect to the upper edges thereof to permit the sacks which are indicated at 7, to be readily and easily secured thereto.

The bottom member of the chute is formed with a cut out portion dividing the bottom into spouts 8, the side members being shown as extending an appreciable distance beyond the front edge of the bottom to provide a support for the sacks.

The inner walls of the spout 8 are formed by the boards 9 which are shown as disposed at angles with respect to the side members 6 of the chute. Connecting the side boards 6 and the members 9 is a bar 10 which holds the side members 6 and members 9 in proper spaced relation with each other. This bar 10 is formed with an opening disposed intermediate its ends for the reception of the bolt 11 which extends through a suitable opening in the bottom member of the chute. A bar 12 is secured to the outer surface of the bottom member of the chute and is formed with an opening to accommodate the bolt 11.

Pivotally supported within the chute is a deflecting blade 13 which has a metal plate 14 secured to the upper surface thereof, which metal plate is formed with an opening to accommodate the bolt 11, a nut 15 being mounted on one end of the bolt 11, for securing the deflecting blade against displacement, but permitting free pivotal movement thereof.

One end of the metal plate 14 is formed into a handle 16 providing means for operating the deflecting blade 13. A clamping member 17 is secured to each of the side members 6, the inner ends of the clamping members being secured to the members 9, the intermediate portions of the clamping members being disposed across the open ends of the spout proper.

Cooperating with the clamping member 17 is a movable clamping member 18, which has right angled end portions 19 formed with openings to accommodate the pivot pins 20. A handle 21 is formed on each of the movable clamping members 18 to permit the movable clamping members to be readily and easily moved into their clamping positions.

Secured to the outer surface of the bottom member at points adjacent to the forward end thereof, are the boards 22 that provide supports for the hook members 23, to which the sacks 7 are secured prior to the positioning of the clamping members. In the use of the device, the chute is supported at the discharge end of a grader, to receive the vegetables therefrom. Sacks to be filled are now positioned over the discharge ends of the spouts of the chute, the clamping members 18 being brought down over the upper portions of the sacks, clamping the sacks in position.

The deflecting blade is now moved to direct vegetables to one of the spouts, and when the sack supported thereon becomes filled, the deflecting blade 13 is moved to a position as indicated in dotted lines in Figure 3, whereupon the vegetables are directed to the opposed spout while the sack is being moved from the adjacent spout.

Having thus described the invention, what is claimed as new is:

In a sacking device, a chute having its lower end formed into a plurality of spouts, said spouts including inclined inner walls, a bar extending across the chute and overlying the inner ends of the inclined inner walls of the spouts, a bolt extending upwardly through the chute and passing through the bar, a deflecting blade pivotally supported within the chute, an elongated member secured to the upper edge of the blade and having an opening to receive the bolt, and a handle formed at one end of the elongated member for permitting the blade to be moved into engagement with opposite sides of the chute to deflect material to the spouts.

In testimony that I claim the foregoing as my own, I have hereto affixed my signature in the presence of two witnesses.

JOHN TORSKE.

Witnesses:
A. A. HABEDANK,
L. J. PETERSON.